United States Patent Office 3,247,107
Patented Apr. 19, 1966

3,247,107
FIRE CONTROL AGENT
James G. Gilchrist, Jr., Bartow, Fla., assignor to International Minerals & Chemical Corporation, a corporation of New York
No Drawing. Filed Sept. 9, 1963, Ser. No. 307,367
4 Claims. (Cl. 252—2)

The present invention generally relates to a novel fire control agent. In a particular aspect it relates to a novel fire control agent comprising finely divided tricalcium phosphate.

The destruction of forests and grasslands by fire is a matter of utmost importance. The United States Department of Agriculture Forest Service has tested various materials and Fire Control Notes, vol. 21, No. 3, July 1960, contains informative articles on borates and monoammonium phosphate as fire retardants. New fire control agents and methods of controlling forest and grass fires are constantly being investigated and the present invention is directed to this problem in general.

Accordingly, it is an object of the present invention to provide a novel fire control agent.

It is also an object of the present invention to provide a novel method of controlling forest and grass fires.

It is a particular object of the present invention to provide a method for controlling forest and grass fires using a novel fire control agent comprising finely divided tricalcium phosphate.

These and other objects and advantages of the present invention will be apparent from the description.

In general, the present invention comprises applying an aqueous mixture containing finely divided tricalcium phosphate to vegetation. It has been determined that when a mixture of water and finely divided tricalcium phosphate is applied to burning vegetation, the fire is frequently extinguished and is in all cases retarded. It has also been determined that when the mixture is applied to vegetation and the vegetation subsequently subjected to ignition temperatures, the vegetation will be more resistant to burning, that is, it will not burn as readily.

The tricalcium phosphate is in finely divided form, preferably of —100 mesh size. The tricalcium phosphate may be mixed or slurried with water so that the solid particles are suspended in the water. The tricalcium phosphate particles may be small enough so that the mixture of tricalcium phosphate and water approaches a sol or a gel, that is, the phosphate may be present as colloidal phosphate, which is a preferred form of the tricalcium phosphate for use as a fire control agent since it has great adhesive power when applied to vegetation.

The mixture of tricalcium phosphate and water may be prepared by mixing finely divided phosphate rock dust with water. Phosphate rock dust is readily available at grinding mills which process phosphate rock. A suitable wetting agent and/or emulsifier and/or dispersant and/or suspending agent may be added to the mixture in an amount effective to keep the tricalcium phosphate solids suspended in the water. Many suitable agents of this type are commercially available. Clays and swelling bentonites are examples of materials which may be used to maintain the phosphate rock in suspension in the water.

A specifically preferred mixture of water and tricalcium phosphate is the so-called slimes-water mixture which is a waste product from phosphate benefication plants. As is well known, in the beneficiation of Florida pebble phosphate, the mined ore is slurried with water and pumped to the refinery or beneficiation plant in which the ore is washed or "deslimed" prior to beneficiation by flotation methods. The desliming is usually effected in hydrocyclones, hydroseparators or classifiers, from which an aqueous stream containing clays and —150 or —200 mesh tricalcium phosphate is withdrawn. This aqueous stream is generally considered a waste product and is pumped into waste ponds. This waste stream contains clayey slimes and it also contains the —150 or —200 mesh tricalcium phosphate in the ore. Much of this phosphate is in colloidal form and even though it may contain as much as 25% of the phosphate values in the ore it is generally considered to be economically impossible to precipitate this phosphate out of solution. This waste stream is generally very stable, and only a small percent of solids settles out when the solution is maintained quiescent even for long periods of time. It has been discovered that this waste stream containing colloidal phosphate is eminently suitable for use as a fire retardant without further addition of any stabilizing agents since, as hereinbefore set forth, the mixture is extremely stable. The clays and colloidal phosphate in the stream adhere to the vegetation to which it is applied and since the clays and tricalcium phosphate are relatively insoluble in water, rains do not readily wash these solids off.

The mixture of water and tricalcium phosphate preferably contains at least 5% by weight of tricalcium phosphate and more preferably contains at least 10% by weight of tricalcium phosphate. At the higher concentrations it is often desirable to add an effective amount of a stabilizer or suspending agent to the solution to keep the tricalcium phosphate from precipitating.

In accordance with the present invention the aqueous mixture containing tricalcium phosphate is applied to vegetation, preferably by spraying so as to achieve a relatively large degree of contact with the outer surface of the vegetation being sprayed so that when the water evaporates a substantial amount of the outer surface of the vegetation is covered or coated with dry tricalcium phosphate. The amount of tricalcium phosphate applied to the vegetation is not critical. In general, the more applied the better it will control the fire.

The mixture of water and finely divided tricalcium phosphate may be applied to the vegetation in any suitable manner. It may be applied to vegetation to prevent fires or hinder a fire's progress or it may be applied directly to burning vegetation. The mixture may be applied to vegetation by aerial spraying or it may be sprayed from trucks or other suitable vehicles.

In addition to being a fire retardant the tricalcium phosphate has value as a plant nutrient. Tricalcium phosphate is a relatively water insoluble material and is not generally considered to be a desirable source of phosphorus for plants because of this relative water insolubility. The tricalcium phosphate is, however, soluble in water to a small extent and since the phosphate is in finely divided form a relatively large surface area is presented so that some dissolving in the soils does occur. The colloidal form of phosphate in the slimes waste stream hereinabove described is particularly satisfactory as a fertilizer because of its relatively large surface area. Therefore, when tricalcium phosphate is used as a fire retardant in accordance with the present invention, a fertilizer ingredient is also applied which aids in restoring the forests or grasslands which may have been destroyed by fire.

In order to give a fuller understanding of the invention, but with no intention to be limited thereto, the following specific examples are given.

*Example I*

An aqueous slurry is prepared by mixing water with 5% by weight of swelling bentonite and 10% by weight of —150 mesh phosphate rock dust. When this aqueous slurry is sprayed onto a grass fire the fire is rapidly extinguished. The phosphate applied in this manner is available as a fertilizer which aids in rebuilding the grass.

Example II

A slimes waste stream recovered from a plant washing Florida pebble phosphate is sprayed onto fire lanes and to the vegetation and trees adjoining highways in an amount to wet a substantial amount of the foliage. After the solution dries the vegetation is coated to a substantial degree with tricalcium phosphate and the vegetation is more resistant to catching fire and the fire lane is more effective in retarding forest fires.

The present invention provides a novel fire retardant and process which is effective to control fires. The mixture of water and finely divided tricalcium phosphate also has fertilizer value which aids in restoring forests and grasslands which may have been destroyed by fire. The mixture of water and tricalcium phosphate is economical to use and, in fact, when the slimes stream from a phosphate rock refinery is utilized as a fire retardant, this provides a new use for a material which heretofore was regarded as a waste product.

The description of the invention utilized specific reference to certain details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A method of treating vegetation to render it more resistant to combustion which comprises spraying the vegetation with water containing at least 5% by weight of $-100$ mesh particles of tricalcium phosphate in suspension.

2. A method of treating vegetation to render it more resistant to combustion which comprises spraying the vegetation with water containing at least 5% by weight of colloidal size particles of tricalcium phosphate.

3. A method of treating vegetation to render it more resistant to combustion which comprises spraying the vegetation with water containing at least 10% by weight of $-100$ mesh particles of tricalcium phosphate in suspension.

4. A method of treating vegetation to render it more resistant to combustion which comprises spraying the vegetation with water containing at least 10% by weight of $-100$ mesh particles of tricalcium phosphate in suspension and an amount of clay sufficient to maintain said tricalcium phosphate in suspension.

References Cited by the Examiner

UNITED STATES PATENTS 2,277,854　3/1942　Lecoq _____ 252—317
2,571,866　10/1951　Greene _____ 23—109 XR

FOREIGN PATENTS 727,770　4/1955　Great Britain.

ALBERT T. MEYERS, *Primary Examiner.*

JULIUS GREENWALD, *Examiner.*

M. WEINBLATT, *Assistant Examiner.*